US010010957B2

(12) United States Patent
Inoue

(10) Patent No.: US 10,010,957 B2
(45) Date of Patent: Jul. 3, 2018

(54) WIRE ELECTRIC DISCHARGE MACHINING APPARATUS

(71) Applicant: SODICK CO., LTD., Kanagawa (JP)

(72) Inventor: Hirotoshi Inoue, Kanagawa (JP)

(73) Assignee: SODICK CO., LTD., Kanagawa (JP)

( * ) Notice: Subject to any disclaimer, the term of this patent is extended or adjusted under 35 U.S.C. 154(b) by 112 days.

(21) Appl. No.: 14/806,655

(22) Filed: Jul. 23, 2015

(65) Prior Publication Data

US 2016/0023291 A1 Jan. 28, 2016

(30) Foreign Application Priority Data

Jul. 25, 2014 (JP) ................................ 2014-151854

(51) Int. Cl.
| B23H 1/10 | (2006.01) |
| B23H 7/10 | (2006.01) |
| B23H 11/00 | (2006.01) |
| B23H 1/02 | (2006.01) |

(52) U.S. Cl.
CPC ............... *B23H 11/00* (2013.01); *B23H 1/02* (2013.01); *B23H 1/10* (2013.01); *B23H 7/102* (2013.01); *B23H 7/104* (2013.01)

(58) Field of Classification Search
CPC ........ B23H 7/102; B23H 7/104; B23H 11/00; B23H 1/10
See application file for complete search history.

(56) References Cited

U.S. PATENT DOCUMENTS

| 4,367,392 A * | 1/1983 | Girardin ................ B23H 7/102 |
| | | 219/69.12 |
| 4,547,647 A | 10/1985 | Schneider |
| 4,778,972 A * | 10/1988 | Josserand .............. B23H 7/102 |
| | | 219/69.12 |
| 2005/0242065 A1* | 11/2005 | Kita ....................... B23H 7/104 |
| | | 219/69.12 |
| 2008/0142487 A1 | 6/2008 | Sakaguchi |
| 2013/0240486 A1* | 9/2013 | Yamada ................. B23H 7/104 |
| | | 219/69.12 |
| 2013/0299459 A1 | 11/2013 | Liu et al. |

FOREIGN PATENT DOCUMENTS

| EP | 667203 A1 * | 8/1995 |
| JP | 02-116423 A * | 5/1990 |
| JP | 2006-110654 A * | 4/2006 |
| JP | 2012-245593 | 12/2012 |
| JP | 2013-049122 | 3/2013 |

OTHER PUBLICATIONS

Machine translation of Japan Patent No. 2-116,423, Jul. 2017.*
Machine translation of Japan Patent No. 2006-110,654, Jul. 2017.*

* cited by examiner

*Primary Examiner* — Geoffrey S Evans
(74) *Attorney, Agent, or Firm* — JCIPRNET

(57) ABSTRACT

A control device 8 controls a tension device 10 to apply a tension to a wire electrode WE such that a set tension value is as small as possible within a range of 80 g or less during a particular anneal period when a particular anneal current is supplied from a current supply device 5.

1 Claim, 4 Drawing Sheets

WIRE ELECTRIC DISCHARGE MACHINING APPARATUS

CROSS-REFERENCE TO RELATED APPLICATION

This application claims the priority benefits of Japanese Patent Application No. 2014-151854, filed on Jul. 25, 2014. The entirety of the above-mentioned patent application is hereby incorporated by reference herein and made a part of this specification.

BACKGROUND OF THE INVENTION

Field of the Invention

The invention relates to a wire electric discharge machining apparatus having an automatic wire threader. Particularly, the invention relates to a wire electric discharge machining apparatus having an automatic wire threader with an anneal device for straightening a wire electrode.

Description of Related Art

A numerical control wire electric discharge machining apparatus includes an automatic wire threader for automatically threading a wire electrode through a start hole pre-drilled in a workpiece, or a kerf formed in a workpiece by machining, so as to stretch the wire electrode between a pair of wire guides.

For example, Patent Document 1 and Patent Document 2 disclose an automatic wire threader for straightening a wire electrode pre-stretched at a particular tension, by removing a curl through annealing the wire electrode, such that the small diameter wire electrode may be threaded through the start hole easier when the wire electrode is guided to an entrance of the start hole using a liquid jet for restraining.

The automatic wire threader having a function for straightening the wire electrode through annealing, supplies a current adapted for annealing the wire electrode ("anneal current") to heat the wire electrode while in a state where a tension being applied is smaller than a tension applied during machining, so as not to break the wire electrode during heating of the wire electrode. In the invention, the conditions during annealing including a set value of the anneal current and a set value of the tension are called the anneal conditions.

Right after supplying a particular anneal current to the wire electrode, a temperature of the wire electrode will increase rapidly. Later, the temperature of the wire electrode stabilizes in a particular temperature range due to a temperature difference between the temperature of the wire electrode and a temperature of the surrounding. As a result, the wire electrode is annealed when a particular amount of time has passed after the anneal current is supplied to the wire electrode.

At this time, if the tension applied to the wire electrode directly after the anneal current is supplied is too small, then the tension will become smaller relative to the expanding elongation rate of the wire electrode caused by the rapid increase in temperature. Due to this, the wire electrode will become slack momentarily, such that an adequate straightness cannot be achieved. Therefore, the wire electrode is annealed while in a state where a tension with a set tension value of around a few hundred g is applied, such that the tension does not become too small and is also within a range in which the wire electrode does not break.

For example, Patent Document 3 discloses an automatic wire threader for suppressing a rapid increase in temperature during an initial annealing period, by supplying a current adequately smaller than the particular anneal current within a particular time period directly after starting annealing such that elongation of the wire electrode is suppressed. According to the invention of Patent Document 3, the wire electrode may be annealed in a straight state without breaking.

CONVENTIONAL ART DOCUMENTS

Patent Documents

[Patent Document 1] U.S. Pat. No. 4,547,647
[Patent Document 2] US Patent Publication No. 2008142487
[Patent Document 3] US Patent Publication No. 2013299459

SUMMARY OF THE INVENTION

An objective of the invention is to provide a wire electric discharge machining apparatus having an automatic wire threader in which stable straightness in a wire electrode may be achieved regardless of the diameter or material. Other objectives and features of the invention are presented in the following description.

The wire electric discharge machining apparatus of the invention includes an automatic wire threader (1) for automatically stretching a wire electrode (WE) between a pair of wire guides (4U, 4L), a tension device (10) for applying a particular tension to the wire electrode (WE), and a current supply device (5) for supplying a particular current to the wire electrode (WE). The wire electric discharge machining apparatus includes a control device (8), controlling the tension device (10) to apply a tension to the wire electrode (WE) such that a set tension value is as small as possible within a range of 80 g or less during a particular period when a particular anneal current is supplied from the current supply device (5), wherein the tension device (10) is controlled at the same time the supply of the particular anneal current is stopped, so as to apply a tension to the wire electrode (WE) such that the set tension value is lowered by 10 g or more within a range such that the set tension value is not 0 g and then is returned to the original set tension value after a particular period of time has passed.

The wire electric discharge machining apparatus of the invention heats the wire electrode while in a state where a tension such that a set tension value is as small as possible within a range of 80 g or less is being applied stably. In addition, at the same time the supply of the particular anneal current is stopped, the wire electric discharge machining apparatus applies a tension to the wire electrode such that the set tension value is lowered by 10 g or more and within a range such that the set tension value is not 0 g, and then is returned to the original set tension value after a particular period of time. Therefore, it is presumed the crystal structure is not adversely affected during annealing and re-crystallization of the wire electrode. In this way, a more stable straightness may be achieved regardless of the diameter and material of the wire electrode.

As a result, the success rate of automatic wire threading is increased and machining efficiency is enhanced. In particular, straightness may be stably obtained by supplying a certain anneal current. In this way, difficult tasks including resetting of the anneal conditions are not required by an operator and burden on the operator is reduced. In addition, a control device for controlling the anneal current and a current detector for accurately detecting the anneal current are not required.

DESCRIPTION OF THE EMBODIMENTS

Figure 1:
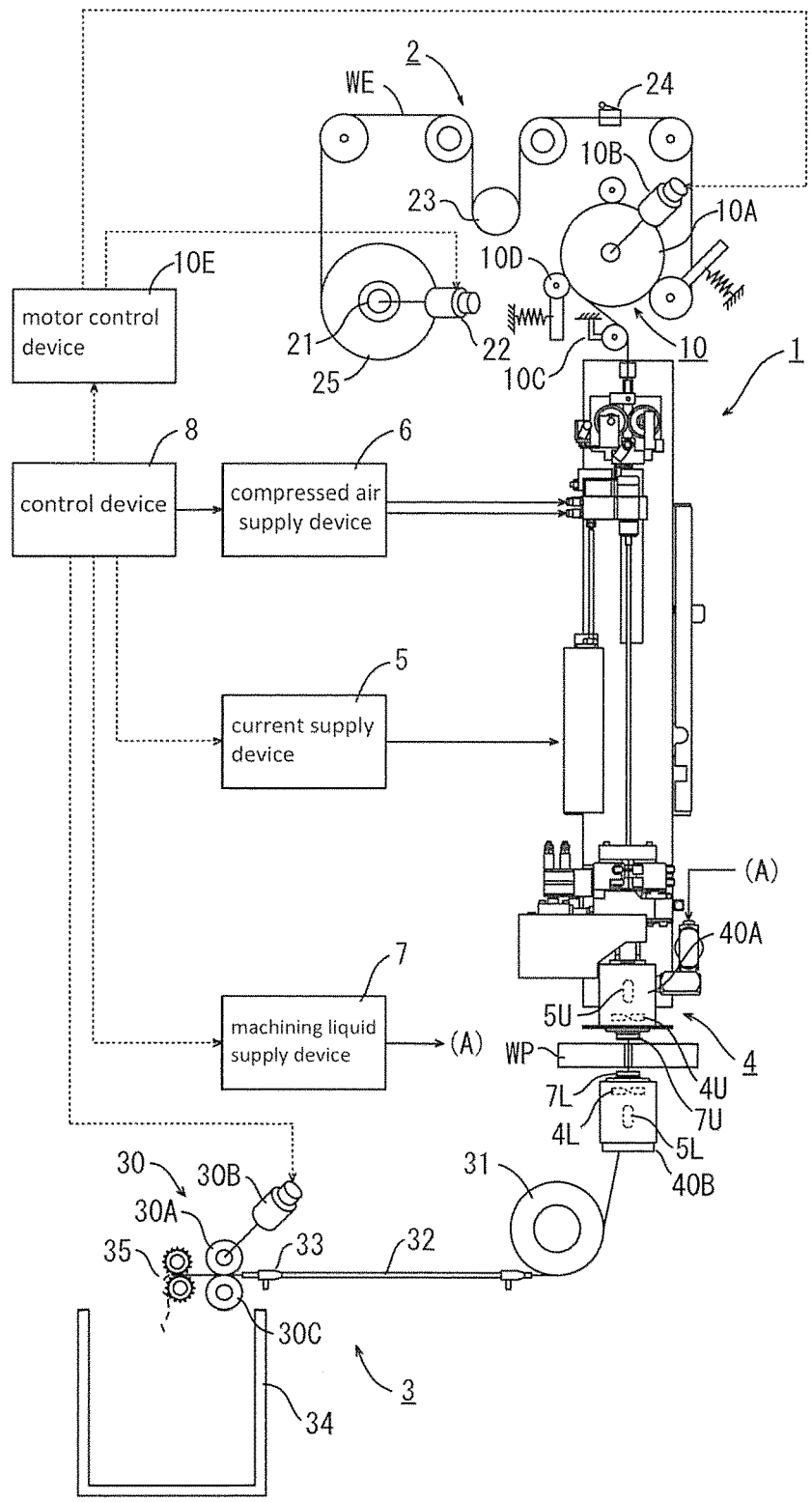
FIG. 1 is a schematic diagram illustrating an abstract of a wire electric discharge machining apparatus of the invention.

FIG. 1 shows an embodiment adapted for the wire electric discharge machining apparatus of the invention. FIG. 1 schematically illustrates a wire electric discharge machining apparatus such that a designated transport path of a wire electrode may be understood. Therefore, in FIG. 1, an automatic wire threader, a wire supply mechanism and a wire guide mechanism are illustrated in a state viewed from the front of the main machine and a wire collecting mechanism is illustrated in a state viewed from a side of the main machine. A construction of the wire electric discharge machining apparatus according to an embodiment is described below with reference to FIG. 1 and FIG. 2.

A wire electrode WE and a workpiece WP are disposed facing each other such that a machining gap is formed between the wire electrode WE and the workpiece WP. A size of the machining gap is typically defined in a range from a few μm to a few tens of him. The wire electrode WE and the workpiece WP are moved relatively in any direction of a horizontal plane by a moving device not shown. A so-called taper device for inclining the wire electrode WE with respect to the workpiece WP is omitted from illustration.

The wire electric discharge machining apparatus includes an automatic wire threader 1, a wire supply mechanism 2, a wire collecting mechanism 3, a wire guide mechanism 4, a current supply device 5, a compressed air supply device 6, a machining liquid supply device 7 and a control device 8. The wire electrode WE is stretched between a pair of wire guides 4U, 4L that is disposed sandwiching the workpiece WP and is in a state where a particular tension is applied along the designated transport path.

The automatic wire threader 1 threads a tip of the wire electrode WE through a start hole to automatically stretch the wire electrode WE between the pair of wire guides 4U, 4L. The automatic wire threader 1 includes at least a guide pipe 11, a wire vibration device 12, an anneal electrode 13, an intermediate feed electrode 14 and a feed electrode drive device 15, as shown with detail in FIG. 2.

The guide pipe 11 is disposed approximately vertically with respect to a horizontal plane along the designated transport path of the wire electrode WE. The guide pipe 11 guides the wire electrode WE from an upper level of the automatic wire threader 1 to the upper wire guide 4U, so as to prevent the wire electrode WE from derailing from the designated transport path. The guide pipe 11 moves up and down in the vertical direction by a lifting device. The guide pipe 11 is moved to an upper limit position when annealing or cutting the wire electrode WE. The guide pipe 11 is moved to an entrance of the upper wire guide 4U which is the lower limit position, when the tip of the wire electrode WE is threaded into the start hole.

The wire vibration device 12 is disposed directly above an entrance of the guide pipe 11. The wire vibration device 12 vibrates the wire electrode WE in the up down direction minutely. The wire vibration device 12 inputs compressed air of a particular pressure sent from the compressed air supply device 6 into a pair of input ports 12A, 12B alternately by switching a solenoid valve not shown, such that pressure of the compressed air is added to the wire electrode WE directly or indirectly along the designated transport path. As a result, the wire electrode WE moves up and down minutely, such that the wire electrode may be threaded through the start hole easier.

An anneal electrode pair 13 is formed by an upper feed electrode 13U and a lower feed electrode 13L. Either one of the upper feed electrode 13U or the lower feed electrode 13L is connected to the positive electrode of a DC power supply of the current supply device 5 and the other is connected to the negative electrode. The intermediate feed electrode 14 is connected to a pole of the above DC power supply opposite to a pole connected to by the lower feed electrode 13L, and supplies a fusing current to the wire electrode WE between the intermediate feed electrode 14 and the lower feed electrode 13L, so as to intentionally cut the wire electrode WE.

The feed electrode drive device 15 is formed by an upper drive device 15U and a lower drive device 15L. The upper drive device 15U includes a magnetic actuator for opening and closing the upper feed electrode 13U which is formed by a pair of rotating bodies. The magnetic actuator biases the upper feed electrode 13U to the wire electrode WE when electricity is supplied. The lower drive device 15L includes an air cylinder or an electric cylinder. The air cylinder or the electric cylinder moves a slider in a horizontal direction, so as to bias the lower feed electrode 13L and the intermediate feed electrode 14 that are fixed on the slider to the wire electrode WE.

The wire supply mechanism 2 repeatedly supplies a new wire electrode WE that has not been subjected to machining to the machining gap along the designated transport path. The wire supply mechanism 2 includes a tension device 10. The wire supply mechanism 2 mainly includes a reel 21, a brake device 22, a servo pulley 23 and a delivery roller 10A which is rotated by a delivery motor 10B. In addition, a disconnection detector 24 such as a limit switch and a tension detector 10C such as a strain gauge are disposed in the wire supply mechanism 2.

Each of the rotating bodies of the wire supply mechanism 2 which includes the reel 21, the servo pulley 23 and the delivery roller 10A, is a guide for guiding the transportation of the wire electrode WE along the designated transport path. In the below description, a rotating direction of each rotating body when the wire electrode WE is being fed is designated as the forward direction and a direction opposite to the forward direction will be designated as the reverse direction.

A wire bobbin 25 for storing the wire electrode WE is rotatably attached to the reel 21. The wire electrode WE is curled due to the wire electrode WE being stored in the wire bobbin 25. The brake device 22 exerts a required torque in the reverse direction of the reel 21 so as to apply a back tension on the wire electrode WE. The brake device 22 prevents the free-spin of the wire bobbin 25 that is loaded on the reel 21 so as to prevent slack in the wire electrode WE in the wire supply mechanism 2.

The brake device 22, more specifically for example, is a brake motor such as a hysteresis motor or a magnetic brake such as a magnetic clutch. When the brake device 22 is a brake motor, it may be operated in synchronism with the delivery motor 10B. When the brake device 22 is a magnetic brake, the brake device 22 is controlled independently of the delivery motor 10B due to the construction in which the breaking force is obtained by the friction of the magnetic clutch. However, the magnetic brake may be operated in accordance with the operation timing of each device of the automatic wire threader 1 since the activation timing of the magnetic brake and the braking force may be controlled through the control device 8.

The servo pulley 23 is disposed between the reel 21 and the delivery roller 10A. The servo pulley 23 applies a certain downward load on the wire electrode WE between the reel 21 and the delivery roller 10A by its own weight. The servo pulley 23 is disposed to be able to move up and down freely. Therefore, the servo pulley 23 moves up and down in accordance with the minute variations of the tension. As a result, the servo pulley 23 absorbs minute vibrations generated on the wire electrode WE fed from the wire bobbin 25 such that the tension is stabilized.

The tension device 10 applies a particular tension to the wire electrode WE. The tension device 10 is included in the wire supply mechanism 2. The tension device 10 mainly includes the delivery roller 10A, the delivery motor 10B, the tension detector 10C, a pinch roller 10D and a motor control device 10E.

The delivery roller 10A is rotated by the delivery motor 10B. The delivery roller 1 OA obtains a driving force for moving the wire electrode WE by using the pinch roller 10D to push the wire electrode WE onto a peripheral surface of the delivery roller 10A. The delivery roller 10A prevents slack in the wire electrode WE by using a plurality of rollers including the pinch roller 10D to smoothly transport the wire electrode WE without causing breakage.

The delivery motor 10B is a servo motor. The delivery motor 10B is controlled through the motor control device 10E according to a command signal of the control device 8. The delivery motor 10B is operated as a servo according to a detection signal of the tension detector 10C by the motor control device 10E. Therefore, even when the set tension value is small, the tension of the wire electrode WE is stable, and the possibility of the wire electrode WE becoming slack or breaking is smaller. The control device 8 may control the delivery motor 10B according to the torque of a winding device 30 of the wire collecting mechanism 3.

When the wire electrode WE is stretched between the pair of wire guides 4U, 4L, the delivery roller 10A applies a particular tension to the wire electrode WE such that the wire electrode WE is in a substantially stopped state or the wire electrode WE is continuously fed to the machining gap at a particular traveling speed, according to a difference in rotating speed between the delivery roller 10A and a winding roller 30A of the winding device 30.

When threading the wire electrode WE, the delivery roller 10A rotates at a constant speed in the forward direction by the delivery motor 10B, so as to insert the tip of the wire electrode WE through the start hole and capture the tip by the wire collecting mechanism 3. Furthermore, when a retry of the automatic wire threading is to be performed, the delivery motor 10B is rotated in the reverse direction at a constant speed, to wind up the wire electrode WE to a particular location.

The wire collecting mechanism 3 collects the wire electrode WE which has been subjected to machining and spent, through the machining gap along the designated transport path. The wire collecting mechanism 3 includes the winding device 30, a direction change pulley 31, a transportation pipe 32, an aspirator 33, a bucket 34 and a wire cutter 35. The winding device 30 mainly includes the winding roller 30A, a winding motor 30B and a pinch roller 30C. The winding roller 30A constitutes a driving roller of the winding device 30 and the pinch roller 30C constitutes a driven roller of the winding device 30.

The wire electrode WE passed through the start hole is threaded through the lower wire guide 4L. The direction of wire electrode WE is changed by the direction change pulley 31 to the horizontal direction, and is inserted into the transportation pipe 32. The wire electrode WE in the transportation pipe 32 is sucked in by the aspirator 33 to obtain a driving force.

The wire electrode WE that has exited the transportation pipe 32 is captured and sandwiched between the winding roller 30A and the pinch roller 30C of the winding device 30. The winding roller 30A rotates at a particular rotation speed in the forward direction following the winding motor 30B which is a constant rotation speed motor such that the spent wire electrode WE is transported at a particular transport speed and drawn directly above the bucket 34. In the wire electric discharge machining apparatus of the embodiment, the wire electrode WE drawn above the bucket 34 is shredded by the wire cutter 35 and accommodated in the bucket 34.

The wire guide mechanism 4 is formed by the pair of upper and lower wire guides 4U, 4L disposed sandwiching the workpiece WP. The upper wire guide 4U and the lower wire guide 4L are incorporated into upper and lower guide assemblies 40A, 40B respectively. The pair of wire guides 4U, 4L positions the wire electrode WE on the designated transport path and guides the wire electrode WE being transported. The pair of wire guides 4U, 4L both has a dice shape. During automatic wire threading, the tip of the wire electrode WE may be passed into the wire guides 4U, 4L due to the few µm of clearance between the wire guides 4U, 4L and the wire electrode WE.

The upper and lower guide assemblies 40A, 40B accommodate an upper electric contact 5U and a lower electric contact 5L respectively for supplying a machining current from the current supply device 5 to the wire electrode WE. In addition, upper and lower flushing nozzles 7U, 7L for flushing the machining liquid of a particular pressure that is supplied by the machining liquid supply device 7 into the machining gap are incorporated in the upper and lower guide assemblies 40A, 40B respectively.

The current supply device 5 includes at least the DC power supply, a switching circuit and a relay switch. In the wire electric discharge machining apparatus of the embodiment, the current supply device 5 includes a machining power circuit for supplying a machining current to the machining gap. Therefore, the current supply device 5 supplies the machining current by applying a voltage pulse required for electric discharge machining to the machining gap, and supplies a particular anneal current and a particular fusing current to the wire electrode WE during automatic wire threading.

The positive electrode of the DC power supply of the current supply device 5 is connected to the upper electric contact 5U and the lower electric contact 5L which are accommodated in the upper and lower guide assemblies 40A, 40B respectively, and the negative electrode is connected to the workpiece WP. During machining, the current supply device 5 applies a voltage pulse to the machining gap repeatedly through each of the upper and lower electric contacts 5U, 5L and the workpiece WP, such that a particular machining current is supplied to the machining gap intermittently.

In the current supply device 5 of the embodiment, the positive electrode of the DC power supply is connected to the upper feed electrode 13U and the intermediate feed electrode 14 of the automatic wire threader 1 through a relay switch not shown therebetween respectively, and the negative electrode is connected to the lower feed electrode 13L through a relay switch therebetween. The anneal electrode pair 13 is formed by the upper feed electrode 13U and the lower feed electrode 13L. The current supply device 5 conducts the anneal electrode pair 13 to supply a particular anneal current to the wire electrode WE during automatic wire threading. In addition, the current supply device 5 conducts the lower feed electrode 13L and the intermediate feed electrode 14 to supply a particular fusing current to the wire electrode WE when intentionally cutting the wire electrode WE.

The compressed air supply device 6 supplies compressed air to the wire vibration device 12 of the automatic wire threader 1 for operation. The compressed air supply device 6 includes a compressed air supply source such as an air compressor, a plurality of solenoid valves and a regulator, not shown. The compressed air supply device 6 adjusts the high pressure compressed air of the compressed air supply source to a particular pressure using the regulator and supplies the compressed air of a particular pressure to the pair of input ports 12A, 12B of the wire vibration device 12 alternately, by switching the solenoid valves regularly.

The machining liquid supply device 7 supplies flushing machining liquid of a particular pressure to the machining gap. The machining liquid supply device 7 supplies clean machining fluid to each of the upper and lower flushing nozzles 7U, 7L disposed in the upper and lower guide assemblies 40A, 40B respectively from a service tank for storing machining liquid using a flushing pump not shown. The flushing machining liquid of a particular pressure is flushed towards the machining gap from each of the upper and lower flushing nozzles 7U, 7L coaxially with respect to the axis direction of the designated transport path of the wire electrode WE.

The control device 8 controls the operation of the wire electric discharge machining apparatus. In the control operation of the control device 8, only the control directly related to the invention is described below. In the wire electric discharge machining apparatus of the embodiment, the control device 8 controls the operation of the automatic wire threader 1. Particularly, the control device 8 controls the current supply device 5 and the tension device 10.

The control device 8 controls the tension device 10 to apply a tension to the wire electrode WE such that a set tension value is as small as possible within a range of 80 g or less during a particular period when a particular anneal current is supplied from the current supply device 5. Particularly, the control device 8 controls the automatic wire threader 1 such that at the same time the supply of the particular anneal current is stopped, the wire electrode WE is in a state of not being heated and is exposed to air to gradually cool in a particular period of time.

The control device 8 of the wire electric discharge machining apparatus of the embodiment controls the current supply device 5 such that a particular anneal current is supplied when a particular period of time has passed after a tension with an adequately small set tension value has been applied to the wire electrode WE. In addition, the control device 8 controls the tension device 10 such that at the same time the particular anneal current is stopped, a tension with a set tension value that is lowered by 10 g or more and within a range such that the set tension value is not 0 g is applied to the wire electrode WE, and then is returned to the original set tension value after a particular period of time.

Figure 2:
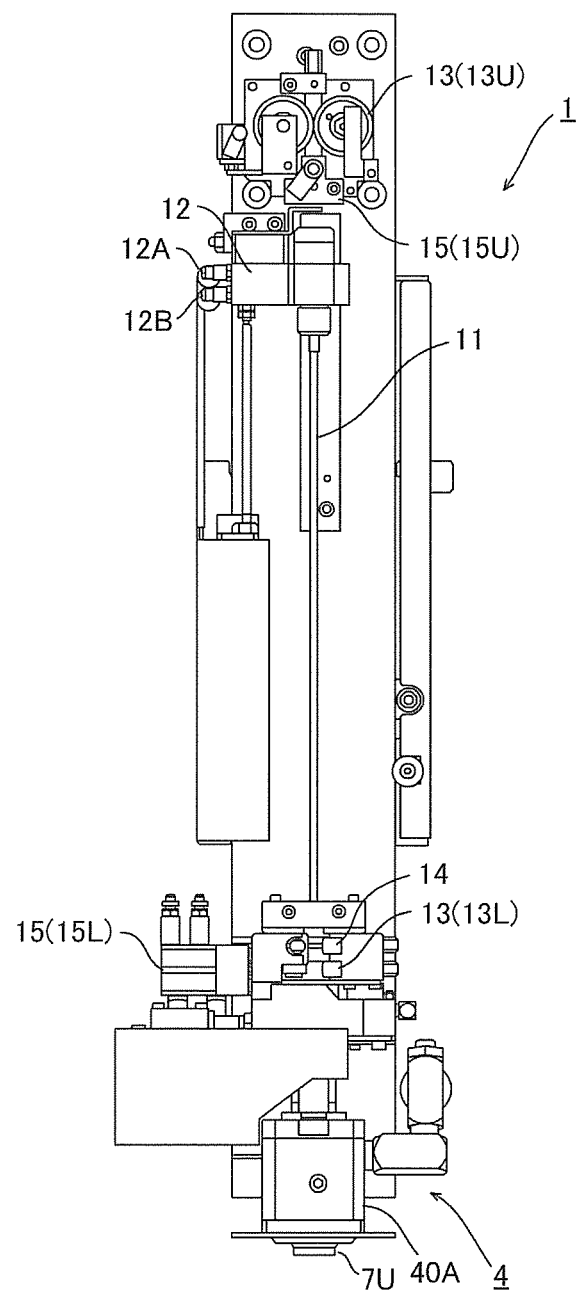
FIG. 2 is a front view illustrating an automatic wire threader.
Figure 3:
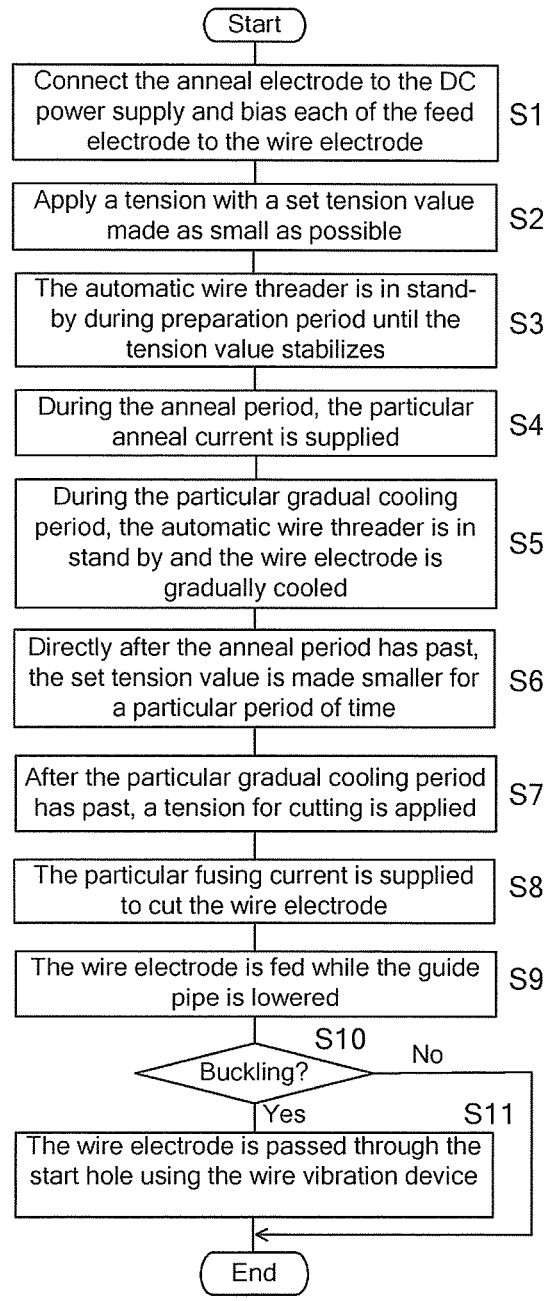
FIG. 3 is a flow chart illustrating an operation of an automatic wire threader of the invention.
Figure 4:
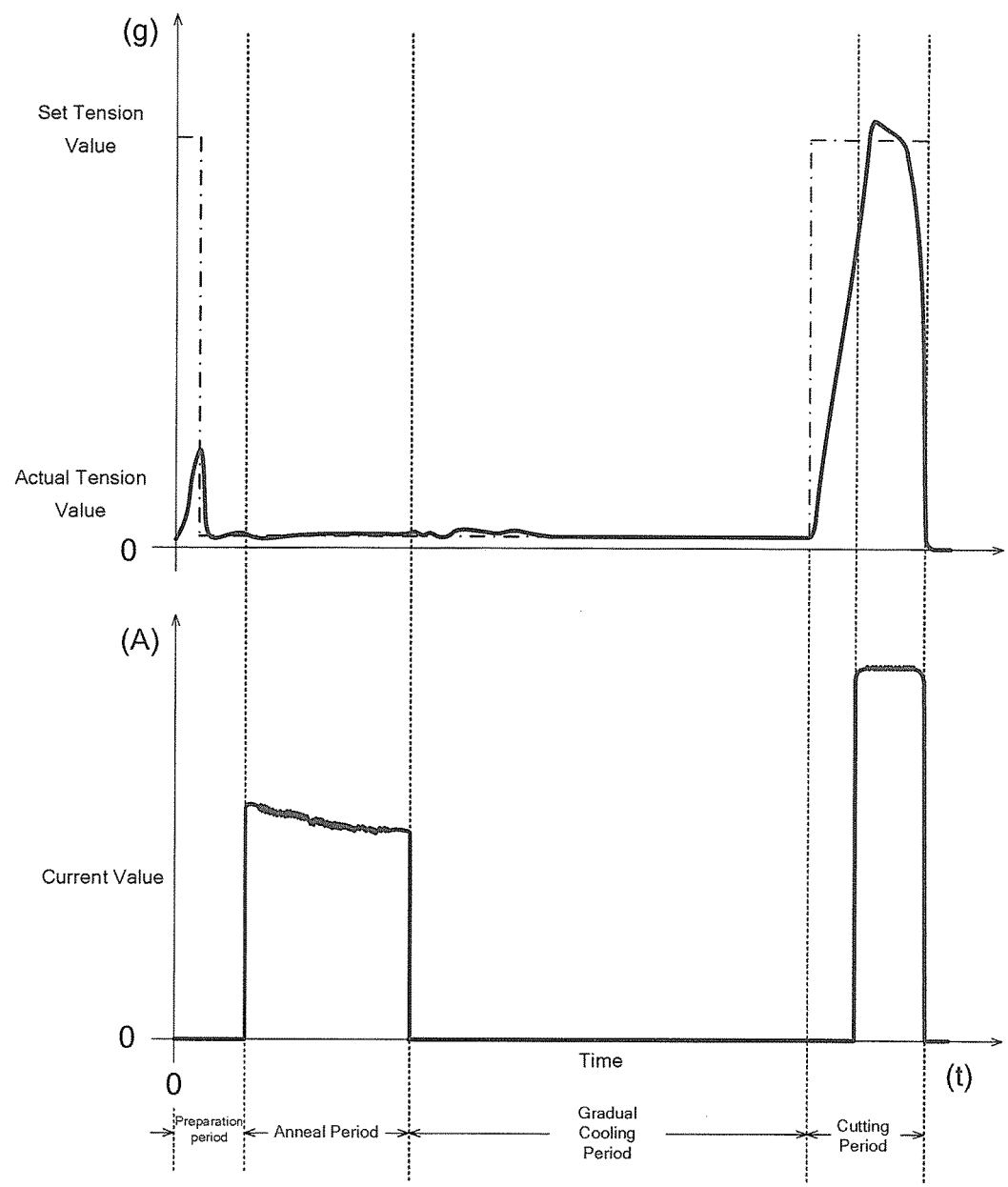
FIG. 4 is a timing chart illustrating a change of an anneal current and tension of an automatic wire threader of the invention.

FIG. 3 illustrates an example operation adapted for the control device and the automatic wire threader illustrated in FIG. 1 and FIG. 2. In addition, FIG. 4 illustrates an example of a change in the anneal current and tension from annealing the wire electrode until cutting. The operation of the automatic wire threader of the embodiment including the control device, the current supply device and the tension device will be described below as illustrated in FIG. 3 and FIG. 4 and accompanied by reference to FIG. 1 and FIG. 2 accordingly.

As shown in FIG. 4, the period beginning from annealing the wire electrode until intentionally cutting will be divided into a preparation period, an anneal period, a gradual cooling period and a cutting period and each period will be described below. The preparation period refers to the period from when the control device 8 outputs a command signal of the set tension value until when a particular anneal current is supplied. The anneal period refers to the period when the anneal current is being supplied. The gradual cooling period refers to the period from when the supplying of the anneal current is stopped until when the wire electrode WE is cooled to a temperature such that the straightness is not affected when a strong tension for cutting is applied, and the tension required for cutting is applied to the wire electrode WE. The cutting period refers to the period from when a required tension adapted for cutting is applied until when the wire electrode WE is melted and cut.

When the wire electrode WE is to be annealed, the control device 8 pre-switches the relay switch of the current supply device 5 such that the upper feed electrode 13U and the lower feed electrode 13L are electrically connected to the DC power supply of the current supply device 5. In addition, the control device 8 activates the feed electrode drive device 15 to bias each of the feed electrodes 13U, 13L, 14 to the wire electrode WE (Step S1).

Next, the control device 8 controls the tension device 10 to apply a tension to the wire electrode WE such that a set tension value is as small as possible within a range of 80 g or less in a state where the transport of the wire electrode WE is stopped (Step S2).

More specifically, the control device 8 stops the rotation of the winding motor 30B in which the winding roller 30A and the pinch roller 30C of the winding device 30 are in a state sandwiching the wire electrode WE and generating a torque substantially stopping and holding the transport of the wire electrode WE. At the same time, the following operations are performed. First, the delivery roller 10A and the pinch roller 10D hold the wire electrode WE. Then the control device 8 drives the delivery motor 10B such that the wire electrode WE is rolled up slightly at a low speed until the particular set tension value of 80 g or less is reached. Next, the control device 8 stops the delivery motor 10B in which the delivery roller 10A and the pinch roller 10D are in a state generating the torque for substantially stopping and holding the transport of the wire electrode WE.

A holding device may be disposed on the designated transport path below the lower feed electrode 13 of the automatic wire threader 1 in place of the winding device 30, so as to hold the transport of the wire electrode WE in a stopped state. In the case where the wire electrode WE is held by the holding device, a tension is applied between the holding device and the delivery roller 10A.

Slack in the wire electrode WE may be suppressed smaller in the initial anneal period by using a larger set tension value during the anneal period. However, it is presumed that the crystal structure is adversely affected during the time when the wire electrode WE re-crystallizes due to the larger external force on the wire electrode WE, such that there is a tendency for a larger variation in the results for obtaining straightness. As such, the wire electrode WE may obtain a more stable straightness by using a smaller set tension value. From a practical application standpoint, a stable straightness of the wire electrode WE cannot be obtained when the set tension value exceeds 80 g regardless of the diameter and material of the wire electrode WE. Therefore, it is desirable for the set tension value to be as small as possible within a range of 80 g or less.

It should be noted, it can be seen the tension with a set tension value of 80 g and lower applied during the anneal period is significantly smaller even compared to the relatively low tension of approximately a few hundred g in the prior art. Therefore, as shown in FIG. 4, a reasonable amount of time is required for the tension to stabilize to the particular set tension value. At this time, if the particular anneal current is supplied to the wire electrode WE right after switching to the particular set tension value, there is a possibility the wire electrode WE will be annealed in a state where the tension is substantially 0 intermittently.

In the wire electric discharge machining apparatus of the embodiment, the control device 8 stops the operation of the automatic wire threader 1 and stands by during the predetermined preparation period beginning from when the command of a particular tension value is outputted until the tension stabilizes (Step S3). Furthermore, in the wire electric discharge machining apparatus of the embodiment, a detection signal of the tension detector 10C may be used to determine whether the tension has stabilized.

After the particular preparation period has passed and the tension stabilizes, the control device 8 controls the switching circuit of the current supply device 5 to conduct the upper feed electrode 13U and the lower feed electrode 13L of the anneal electrode pair 13 during the particular anneal period such that a particular anneal current is supplied to the wire electrode WE (Step S4). The current value of the particular anneal current that is supplied during the anneal period is pre-set as the anneal conditions according to the diameter and material of the wire electrode WE. Therefore, the set current value is not required to be manipulated during the anneal period.

After the particular anneal period has passed, the control device 8 stops supplying the particular anneal current and stops the operation of the automatic wire threader 1 and makes it stand by in a state where an extremely small tension with a set tension value 80 g or less is applied to the wire electrode WE such that the wire electrode WE is exposed to air and radiates heat to cool down gradually (Step S5).

It is presumed that, if a large tension is applied prior to when annealing and re-crystallization of the wire electrode WE are completed by decreasing sufficiently the temperature of the wire electrode WE, then the crystal structure will deteriorate and straightness will be lost. Therefore, in the wire electric discharge machining apparatus of the embodiment, the operation of the automatic wire threader 1 is stopped during the particular gradual cooling period required for sufficient re-crystallization of the wire electrode WE, in a state while a small tension of the anneal period is applied.

The gradual cooling period should be made as short as possible so as to shorten the automatic wire threading time. However, more specifically, the gradual cooling period required for achieving straightness of the wire electrode WE is from tens of milliseconds to a few seconds. Therefore, the time required for automatic wire threading will not be extremely long. During the gradual cooling period, the wire electrode WE shrinks in the tension direction and becomes straight slowly, such that deterioration of the crystal structure of the wire electrode WE may be suppressed. The wire electrode WE may be annealed while the straightness is maintained and the curl may be reliably removed almost without being affected by the diameter and material of the wire electrode WE.

After the anneal period has passed, the control device 8 of the wire electric discharge machining apparatus in the embodiment controls the tension device 10 at the same time when the supply of the particular anneal current is stopped, so as to lower the set tension value by 10 g or more and within a range such that the set tension value is not 0 g, for a particular period of time (Step S6). The set tension value is returned to the original set tension value after the particular period has passed in which the shrinking speed of the wire electrode WE has decreased.

During a particular period directly after the anneal period has passed, the wire electrode WE will shrink slightly quickly, and therefore there is a possibility that the actual tension applied to the wire electrode WE will become larger than the set tension value and exceed the acceptable momentary limit. To be certain, the wire electric discharge machining apparatus of the embodiment lowers the set tension value for a period of time directly after the anneal period has passed until the shrinking speed of the wire electrode WE decreases and the shrinking settles. Therefore, directly after the anneal period is completed, the actual tension on the wire electrode WE may be made almost substantially the same as the original set tension value. As such, there is no risk of losing the straightness obtained by annealing, and thus straightness is achieved more stably.

After the particular gradual cooling period has passed, the control device 8 controls the tension device 10 such that a tension adapted for cutting the wire electrode WE is applied to the wire electrode WE which has already achieved straightness (Step S7). The tension adapted for cutting is from a few hundred g to a thousand and a few hundred g according to the diameter and material of the wire electrode WE.

After the particular tension with a set tension value adapted for cutting the wire electrode WE is applied, the electrical connection of the current supply device 5 is switched, such that the upper feed electrode 13U is cut off from the DC power supply and the lower feed electrode 13L and the intermediate feed electrode 14 are connected to the negative electrode and the positive electrode of the DC power supply respectively. Then, the particular fusing current is supplied to partially melt and cut the wire electrode WE (Step S8).

The diameter of the wire electrode WE has become slightly smaller due to the relatively strong tension applied after annealing. The wire electrode WE is melted and cut between the lower feed electrode 13L and the intermediate feed electrode 14 where the diameter of the wire electrode WE is made smaller. In this way, the wire electrode WE does not re-bound in a large manner and may be positioned on the designated transport path while straightness is maintained. In addition, the tip of the wire electrode WE after being cut becomes narrow and round while straightness is maintained.

After the cutting period in which the wire electrode WE is cut, the control device 8 lowers the guide pipe 11 to the entrance of the upper wire guide 4U. At the same time, the delivery motor 10B is driven to rotate the delivery roller 10A in the forward direction, and controls the tension device 10 such that the wire electrode WE in the guide pipe 11 is fed in tune with the lowering of the guide pipe 11 (Step S9). Furthermore, the control device 8 activates the winding device 30 to pre-eject the wire electrode WE left in the wire collecting mechanism 3 after the wire electrode WE is cut.

The wire electrode WE fed out is guided by the guide pipe 11 and passes through the upper wire guide 4U. When the wire electrode WE which is passed through the upper wire guide 4U is stopped by the start hole drilled in the workpiece WP, a buckle sensor not shown detects the wire electrode WE is buckled (Step S10).

When it is detected that the wire electrode WE has buckled, the control device 8 controls the tension device 10 so as to rotate the delivery roller 10A in the reverse direction, such that the wire electrode WE is winded up by a particular amount for a moment. Then the control device 8 activates the wire vibration device 12 to move the wire electrode WE up and down minutely to guide the tip of the wire electrode WE into the start hole (Step S11). Though not shown, in the case when moving the wire electrode WE up and down minutely to insert the tip into the start hole is unsuccessful, the tip of the wire electrode WE may be cut and removed, and a retry operation for performing from the beginning of automatic wire threading again may be performed.

The wire electrode WE that has passed through the start hole drilled in the workpiece WP passes through the lower wire guide 4L and is captured by the transport pipe 32. The control device 8 activates the aspirator to suck in the wire electrode WE in the transport pipe 32. The wire electrode WE pulled out of the transport pipe 32 is sandwiched by the winding roller 30A and the pinch roller 30C of the winding device 30 and the wire threading is completed.

The invention is not limited to the wire electric discharge machining device specifically shown in the embodiment. It is intended that the invention covers modifications and variations of this invention provided they fall within the scope of the following claims and their equivalents.

What is claimed is:

1. A wire electric discharge machining apparatus comprising an automatic wire threader for automatically stretching a wire electrode between a pair of wire guides, comprising:
   a tension roller assembly comprising a delivery roller and a delivery motor, applying a particular tension to the wire electrode;
   a current supplier for supplying a current to the wire electrode; and
   a controller, controlling the tension roller assembly to apply a tension to the wire electrode such that an original set tension value is within a first range of at most 80 g during a period when an anneal current is supplied from the current supplier,
   wherein, the tension roller assembly is controlled at the same time the supply of the anneal current is stopped, so as to apply a tension to the wire electrode such that the original set tension value is lowered by at least 10 g to a lowered set tension value and within a second range such that the lowered set tension value is not 0 g, and then the lowered set tension value is returned to the original set tension value after a period of time has passed.

* * * * *